United States Patent
Jeon

(10) Patent No.: US 9,298,233 B2
(45) Date of Patent: Mar. 29, 2016

(54) DRIVER IC OF DISPLAY APPARATUS AND METHOD OF GENERATING LOGIC VOLTAGE USING DRIVER IC

(75) Inventor: Jin-Young Jeon, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 954 days.

(21) Appl. No.: 13/526,822

(22) Filed: Jun. 19, 2012

(65) Prior Publication Data

US 2013/0175932 A1 Jul. 11, 2013

(30) Foreign Application Priority Data

Jan. 6, 2012 (KR) .................. 10-2012-0002020

(51) Int. Cl.
  *G09G 3/32* (2006.01)
  *G09G 3/36* (2006.01)
  *G06F 1/26* (2006.01)

(52) U.S. Cl.
  CPC ............ *G06F 1/26* (2013.01); *G09G 2330/026* (2013.01)

(58) Field of Classification Search
  None
  See application file for complete search history.

(56) References Cited

U.S. PATENT DOCUMENTS

2011/0273427 A1* 11/2011 Park ..................... G09G 3/3225
  345/212
2012/0044273 A1* 2/2012 Park ........................ G09G 3/20
  345/690

FOREIGN PATENT DOCUMENTS

| JP | 2000-105566 | 4/2000 |
| KR | 10-2007-0047930 A | 5/2007 |
| KR | 10-2009-0117209 A | 11/2009 |

\* cited by examiner

*Primary Examiner* — Douglas W Owens
*Assistant Examiner* — Dedei K Hammond
(74) *Attorney, Agent, or Firm* — Lee & Morse, P.C.

(57) ABSTRACT

A driver integrated circuit of a display apparatus generates a logic voltage in a power environment in which an analog voltage and a logic input/output voltage are irregularly inputted to the driver integrated circuit. The driver integrated circuit includes a first power generating unit that generates a first reference current and a first reference voltage based on the analog voltage, a second power generating unit that generates a second reference current and a second reference voltage based on the logic input/output voltage, and a logic voltage generating unit that generates a logic voltage in response to the first reference current and voltage or the second reference current and voltage according to an application order of the analog voltage and the logic input/output voltage.

14 Claims, 7 Drawing Sheets

DRIVER IC OF DISPLAY APPARATUS AND METHOD OF GENERATING LOGIC VOLTAGE USING DRIVER IC

CROSS-REFERENCE TO RELATED PATENT APPLICATION

Korean Patent Application No. 10-2012-0002020, filed on Jan. 6, 2012, in the Korean Intellectual Property Office, and entitled "Driver IC of Display Apparatus and Method of Generating Logic Voltage Using Driver IC," is incorporated by reference herein in its entirety.

BACKGROUND

A display apparatus displays an image corresponding to an input image, e.g., by applying a scan signal and a data signal to a plurality of pixels.

SUMMARY

Embodiments may be realized by providing a driver integrated circuit (IC) of a display apparatus that generates a logic voltage in a power environment in which an analog voltage and a logic input/output (IO) voltage are irregularly inputted to the driver IC. The driver IC includes a first power generating unit for generating a reference current and a reference voltage based on the analog voltage, a second power generating unit for generating a reference current and a reference voltage based on the logic I/O voltage, and a logic voltage generating unit for generating a logic voltage in response to the reference current and the reference voltage generated by one of the analog voltage and the logic I/O voltage according to a voltage applying order.

The driver IC may further include a second switch for outputting the reference current generated by the analog voltage or the reference current generated by the logic I/O voltage to the logic voltage generating unit, and a third switch for outputting the reference voltage generated by the analog voltage or the reference voltage generated by the logic I/O voltage to the logic voltage generating unit.

A driving current generated by one of the analog voltage and the logic I/O voltage may be applied to the logic voltage generating unit according to a voltage applying order. The driver IC may further include a first switch for outputting the driving current to the logic voltage generating unit.

When the analog voltage is first applied to the driver IC, the first switch may output the driving current generated by the analog voltage to the logic voltage generating unit, and the second switch may output the reference current generated by the analog voltage to the logic voltage generating unit, and the third switch may output the reference voltage generated by the analog voltage to the logic voltage generating unit. When the logic I/O voltage is subsequently applied to the driver IC, the first switch may output the driving current generated by the logic I/O voltage to the logic voltage generating unit.

When the logic I/O voltage is first applied to the driver IC, the first switch may output the driving current generated by the logic I/O voltage to the logic voltage generating unit, and the second switch may output the reference current generated by the logic I/O voltage to the logic voltage generating unit, and the third switch may output the reference voltage generated by the logic I/O voltage to the logic voltage generating unit. When the analog voltage is subsequently applied to the driver IC, the second switch may output the reference current generated by the analog voltage to the logic voltage generating unit, and the third switch may output the reference voltage generated by the analog voltage to the logic voltage generating unit.

Embodiments may also be realized by providing a method of generating a logic voltage in a power environment in which an analog voltage and a logic input/output (IO) voltage are irregularly inputted to the driver IC. The method includes generating a reference current and a reference voltage based on one of the analog voltage and the logic I/O voltage according to a voltage applying order, and generating a logic voltage based on the reference current and the reference voltage generated by one of the analog voltage and the logic I/O voltage.

The generating of the logic voltage may include applying a driving current generated by one of the analog voltage and the logic I/O voltage according to the voltage applying order.

The generating of the logic voltage may further include, when the analog voltage is first applied to the driver IC, generating the logic voltage based on the driving current, the reference current, and the reference voltage generated by the analog voltage. The generating of the logic voltage may further include, when the logic I/O voltage is subsequently applied to the driver IC, generating the logic voltage based on the driving current generated by the logic I/O voltage and the reference current and the reference voltage generated by the analog voltage.

The generating of the logic voltage may further include, when the logic I/O voltage is first applied to the driver IC, generating the logic voltage based on the driving current, the reference current, and the reference voltage generated by the logic I/O voltage. The generating of the logic voltage may further include, when the analog voltage is subsequently applied to the driver IC, generating the logic voltage based on the driving current generated by the logic I/O voltage and the reference current and the reference voltage generated by the analog voltage.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
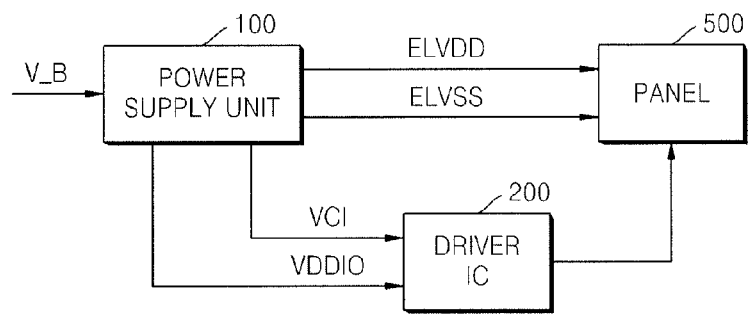
FIG. 1 illustrates a block diagram schematically showing a structure of a display apparatus according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. In the description, certain detailed explanations of related art are omitted when it is deemed that they may unnecessarily obscure the essence of the exemplary embodiments.

Like reference numerals refer to like elements throughout. While such terms as "first," "second," etc., may be used to describe various components, such components must not be limited to the above terms. The above terms are used only to distinguish one component from another. For example, a first component may be referred to as a second component, and likewise, a second component may be referred to as a first component without departing from the scope of the invention.

The terms used in the present specification are merely used to describe particular embodiments, and are not intended to limit the embodiments. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram schematically illustrating a structure of a display apparatus according to an exemplary embodiment. Referring to FIG. 1, the display apparatus according to the present embodiment may include a power supply unit 100, a driver integrated circuit (IC) 200, and a panel 500.

The display apparatus illustrated in FIG. 1 may include at least one of a variety of display apparatuses, such as an organic light-emitting display apparatus, a liquid crystal display (LCD) apparatus, a field emission display (FED) apparatus, and the like.

The power supply unit 100 receives an input voltage V_B from an external power unit, such as a battery, or the like, converts the input voltage V_B in response to a plurality of control signals to generate a first driving voltage ELVDD, e.g., a pixel power supply, and a second driving voltage ELVSS, e.g., a ground power supply, and an analog voltage VCI and a logic input/output (I/O) voltage VDDIO. The first driving voltage ELVDD and the second driving voltage ELVSS are inputted to the panel 500, e.g., from the power supply unit 100. The analog voltage VCI and the logic I/O voltage VDDIO are inputted to the driver IC 200, e.g., from the power supply unit 100.

The driver IC 200 receives the analog voltage VCI and the logic I/O voltage VDDIO from the power supply unit 100 and may convert the analog voltage VCI and the logic I/O voltage VDDIO to generate an internal logic voltage of the driver IC 200 and a driving signal to be outputted to the panel 500.

When the driver IC 200 generates the internal logic voltage by using only the analog voltage VCI, if the logic I/O voltage VDDIO is first inputted to the driver IC 200 and the analog voltage VCI is not yet or is not inputted to the driver IC 200, the internal logic voltage may not be generated by using the analog voltage VCI so that a leakage current and/or logic malfunction may occur. For example, a leakage current and/or logic malfunction may occur if the internal logic voltage is generated after the logic I/O voltage VDDIO is inputted and before the analog voltage VCI is inputted to the driver IC 200.

In contrast, when the driver IC 200 generates the internal logic voltage by using only the logic I/O voltage VDDIO, if the analog voltage VCI is first inputted to the driver IC 200 and the logic I/O voltage VDDIO is not yet or is not inputted to the driver IC 200, the internal logic voltage may not be generated by using the logic I/O voltage VDDIO so that a leakage current and/or logic malfunction may occur. For example, a leakage current and/or logic malfunction may occur if the internal logic voltage is generated after the analog voltage VCI is inputted and before the logic I/O voltage VDDIO is inputted to the driver IC 200.

Thus, according to the current exemplary embodiment, the internal logic voltage of the driver IC 200 may be generated by using both two voltages, i.e., the analog voltage VCI and the logic I/O voltage VDDIO. Thus, even when one of the two voltages is first inputted to the driver IC 200, the internal logic voltage of the driver IC 200 may still be generated by using both two voltages. Thus, a stable logic voltage may be generated, and an internal logic block of the driver IC 200 may be initialized so that, e.g., the possibility of an occurrence of logic malfunction and/or leakage current may be reduced and/or prevented.

The driver IC 200 may include a scan driver, a data driver, and a timing controller. The scan driver, the data driver, and the timing controller each may be mounted in the form of at least one IC chip directly on the panel 500 or may be integrated with the panel 500 together with signal lines S1 to Sn and D1 to Dm and a thin film transistor. According to an exemplary embodiment, the scan driver, the data driver, and the timing controller may be integrated as a single chip.

The panel 500 is connected to the scan driver, the data driver, and the timing controller. The panel 500 may include a plurality of scan lines S1 to Sn, a plurality of data lines D1 to Dm, and a plurality of pixels P. Each of the plurality of scan lines S1 to Sn is spaced apart from other scan lines, e.g., is arranged in a different row than the other scan lines, and transmits scan signals outputted from the scan driver. Each of the plurality of data lines D1 to Dm is spaced apart from other data lines, e.g., is arranged in a different column than the other data lines, and transmits data signals outputted from the data driver. The scan lines S1 to Sn and the data lines D1 to Dm are arranged in a matrix form. In this regard, one pixel P is formed on a region in which the scan lines S1 to Sn and the data lines D1 to Dm cross each other.

The panel 500 may receive the first power voltage ELVDD and the second power voltage ELVSS from the power supply unit 100 and may supply the first power voltage ELVDD and the second power voltage ELVSS to each pixel P. A pixel circuit of each pixel P may include a transistor, a capacitor, and a light-emitting element. In each pixel, a driving current flows through the light-emitting element from the first power voltage ELVDD and to the second power voltage ELVSS. The driving current may allow the light-emitting element to emit light in response to the data signals to the pixel P.

Figure 2:
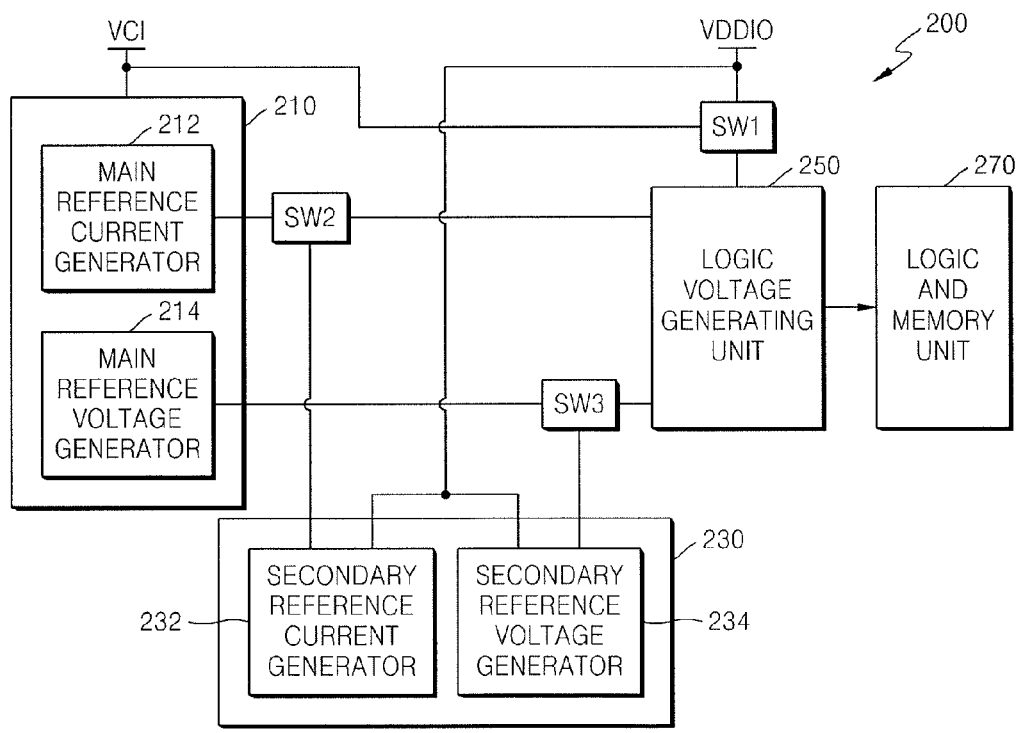
FIG. 2 illustrates a block diagram schematically showing an internal structure of a driver integrated circuit (IC) of the display apparatus illustrated in FIG. 1, according to an exemplary embodiment.

FIG. 2 is a block diagram schematically illustrating an internal structure of the diver IC 200 of the display apparatus illustrated in FIG. 1, according to an exemplary embodiment. Referring to FIG. 2, the driver IC 200 may include a first power generating unit 210, a second power generating unit 230, a logic voltage generating unit 250, and a logic unit 270.

The analog voltage VCI and the logic I/O voltage VDDIO may not be simultaneously applied to the driver IC 200 according to a power environment and structure of the display apparatus, and one of the analog voltage VCI and the logic I/O voltage VDDIO may be first inputted to the driver IC 200. The other of the analog voltage VCI and the logic I/O voltage VDDIO may be second inputted to the driver IC 200. A leakage current, logic malfunction, and/or the like may be prevented from occurring by stably supplying a logic voltage to the driver IC 200 on such irregular external voltage input condition.

According to an exemplary embodiment, the internal logic voltage of the driver IC 200 may be generated by using the first-inputted voltage of the analog voltage VCI and the logic I/O voltage VDDIO.

For example, the first power generating unit 210 may receive the analog voltage VCI and convert the received analog voltage VCI to generate a reference current and a reference voltage. The first power generating unit 210 may include a main reference current generator 212 and a main reference voltage generator 214. The first power generating unit 210 may be implemented as a regulator, or the like.

The main reference current generator 212 may generate a reference current by converting the analog voltage VCI and outputting the generated reference current to the logic voltage generating unit 250 via a second switch SW2.

The main reference voltage generator 214 may generate a reference voltage by converting the analog voltage VCI and outputting the generated reference voltage to the logic voltage generating unit 250 via a third switch SW3.

The second power generating unit 230 may generate a reference current and a reference voltage by receiving the logic I/O voltage VDDIO and converting the received logic I/O voltage VDDIO. The second power generating unit 230 may include a secondary reference current generator 232 and a secondary reference voltage generator 234. The second power generating unit 230 may be implemented as a regulator, or the like.

The secondary reference current generator 232 may generate a reference current by converting the logic I/O voltage VDDIO and output the generated reference current to the logic voltage generating unit 250 via the second switch SW2.

The secondary reference voltage generator 234 may generate a reference voltage by converting the logic I/O voltage VDDIO and output the generated reference voltage to the logic voltage generating unit 250 via the third switch SW3.

The driving current for driving the logic voltage generating unit 250 converted from the analog voltage VCI and the logic I/O voltage VDDIO may be applied to the logic voltage generating unit 250 via a first switch SW1.

The logic voltage generating unit 250 may be driven by the driving current applied via the first switch SW1. The reference current may be applied to the logic voltage generating unit 250 via the second switch SW2, and the reference voltage may be applied to the logic voltage generating unit 250 via the third switch SW3. The logic voltage generating unit 250 may generate the logic voltage based on the reference current and the reference voltage so that the logic unit 270 may be initialized and driven. The logic voltage generating unit 250 may be implemented as a regulator and an amplifier, according to an exemplary embodiment.

The reference voltage and the reference current may be supplied to the logic voltage generating unit 250 when one of the analog voltage VCI and the logic I/O voltage VDDIO is inputted to the driver IC 200. The driving current may be supplied to the logic voltage generating unit 250 when one of the analog voltage VCI and the logic I/O voltage VDDIO is inputted to the driver IC 200.

The first switch SW1, the second switch SW2, and the third switch SW3 may be implemented as one or more PMOS or NMOS transistors.

The logic unit 270 may include a plurality of logic and memory units and may generate a plurality of signals for driving the panel 500.

Figure 3A:
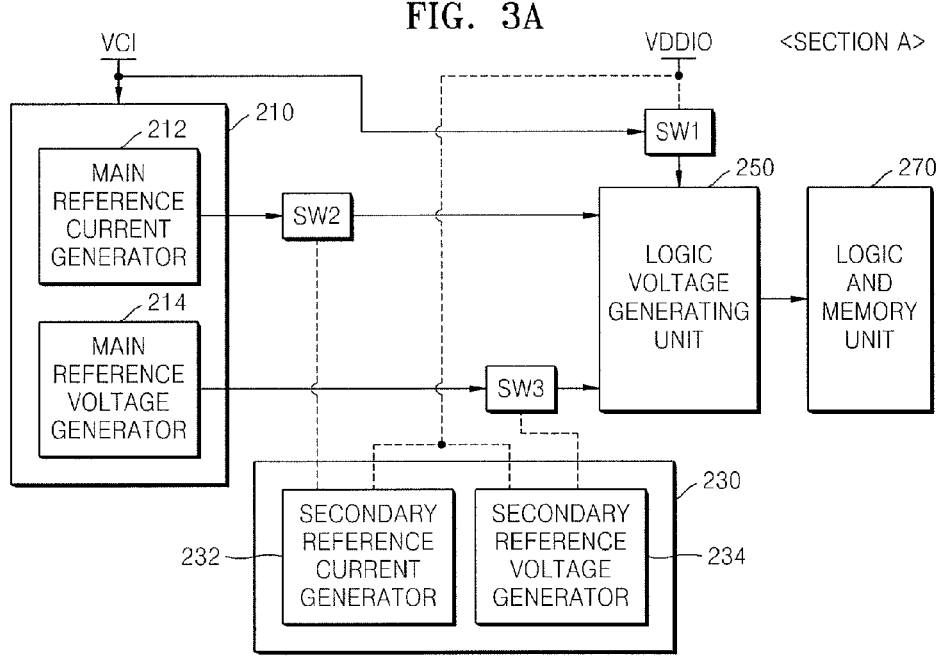
FIGS. 3A and 3B illustrate block diagrams showing a first logic voltage generating operation performed by the driver IC illustrated in FIG. 2, according to an exemplary embodiment.
Figure 3B:
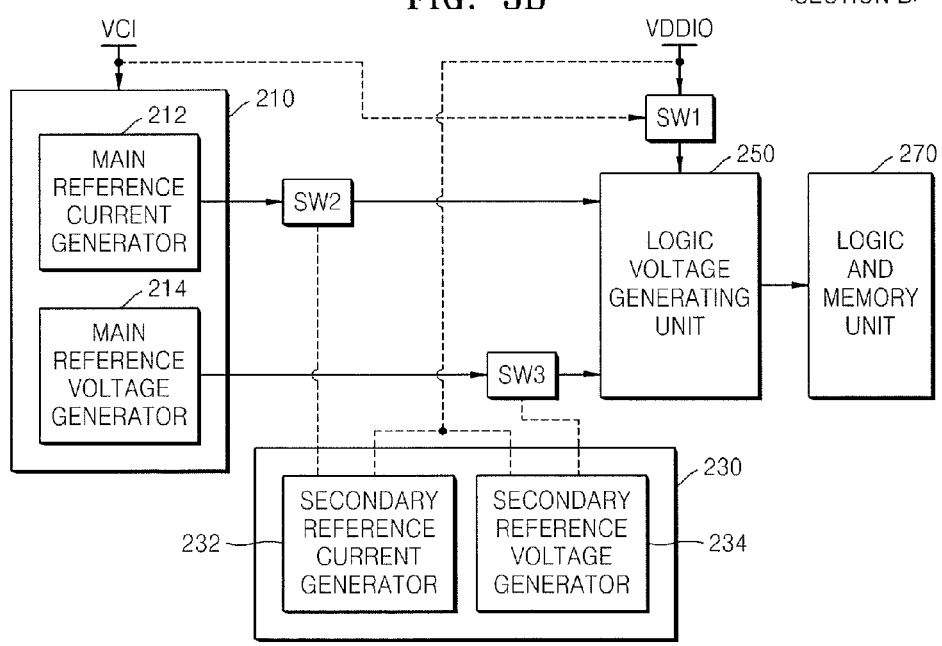
Figure 4:
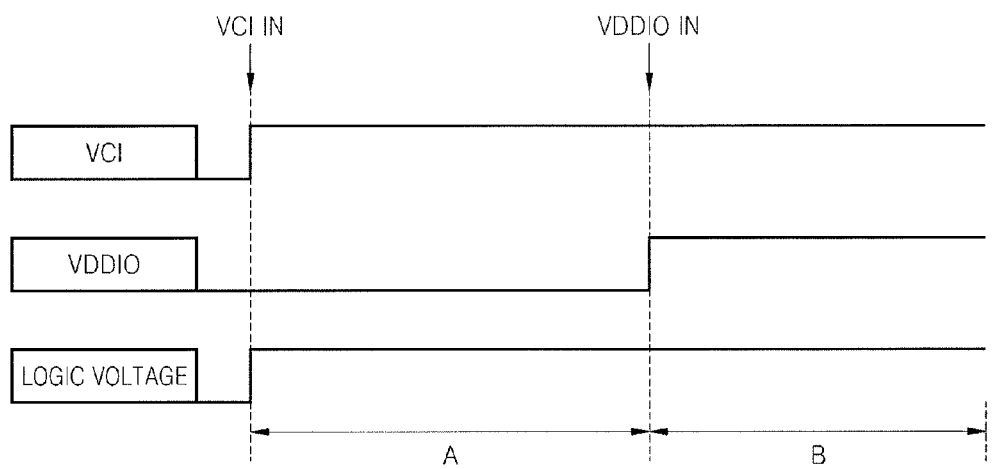
FIG. 4 illustrates a timing diagram of generating a logic voltage when the first logic voltage generating operation illustrated in FIGS. 3A and 3B is performed.

FIGS. 3A and 3B are block diagrams illustrating a first logic voltage generating operation performed by the driver IC 200 illustrated in FIG. 2, according to an exemplary embodiment, and FIG. 4 illustrates a timing diagram of generating a logic voltage when the first logic voltage generating operation illustrated in FIGS. 3A and 3B is performed.

FIGS. 3A and 3B illustrate operations of the driver IC 200 in a power environment in which the analog voltage VCI is first applied to the driver IC 200 and then the logic I/O voltage VDDIO is applied to the driver IC 200.

FIG. 3A illustrates an operation of the driver IC 200 in a power environment (section A) in which the analog voltage VCI is first applied to the driver IC 200 and the logic I/O voltage VDDIO is not applied to the driver IC 200.

The first power generating unit 210 receives the analog voltage VCI, and the analog voltage VCI is applied to the main reference current generator 212 and the main reference voltage generator 214. In this regard, the second power generating unit 230 is in an off state, e.g., a non-operational state.

The main reference current generator 212 generates the reference current by converting the analog voltage VCI. The main reference voltage generator 214 generates the reference voltage by converting the analog voltage VCI.

The first switch SW1 connects the power supply unit 100 for supplying the analog voltage VCI and the logic voltage generating unit 250. Thus, the driving current generated by the analog voltage VCI is applied to the logic voltage generating unit 250.

The second switch SW2 connects the main reference current generator 212 and the logic voltage generating unit 250. Thus, the reference current outputted from the main reference current generator 212 is applied to the logic voltage generating unit 250.

The third switch SW3 connects the main reference voltage generator 214 and the logic voltage generating unit 250. Thus, the reference voltage outputted from the main reference voltage generator 214 is applied to the logic voltage generating unit 250.

FIG. 3B illustrates an operation of the driver IC 200 in a power environment (section B) in which the analog voltage VCI is first applied to the driver IC 200 and then thereafter the logic I/O voltage VDDIO is applied to the driver IC 200.

Subsequent to the section A, the first power generating unit 210 receives the analog voltage VCI, and the main reference current generator 212 generates the reference current by converting the analog voltage VCI, and the main reference voltage generator 214 generates the reference voltage by converting the analog voltage VCI. The second power generating unit 230 is maintained in an off state.

The first switch SW1 connects the power supply unit 100 for supplying the logic I/O voltage VDDIO and the logic voltage generating unit 250. Thus, the driving current generated by the logic I/O voltage VDDIO is applied to the logic voltage generating unit 250.

The second switch SW2 connects the main reference current generator 212 and the logic voltage generating unit 250. Thus, the reference current outputted from the main reference current generator 212 is applied to the logic voltage generating unit 250.

The third switch SW3 connects the main reference voltage generator 214 and the logic voltage generating unit 250. Thus, the reference voltage outputted from the main reference voltage generator 214 is applied to the logic voltage generating unit 250.

Referring to FIG. 4, in the section A, the analog voltage VCI is applied to the first power generating unit 210, and the reference voltage and the reference current generated by the analog voltage VCI are applied to the logic voltage generating unit 250 so that a logic voltage is generated by the logic voltage generating unit 250.

In the section B, e.g., subsequent to section A, the logic I/O voltage VDDIO is applied to the first power generating unit 210, and the reference voltage and the reference current generated by the analog voltage VCI are applied to the logic voltage generating unit 250 so that a logic voltage is generated by the logic voltage generating unit 250.

The driving current for driving the logic voltage generating unit 250 is generated by the analog voltage VCI and then is applied to the logic voltage generating unit 250 in the section A. The driving current for driving the logic voltage generating unit 250 is generated by the logic I/O voltage VDDIO and then is applied to the logic voltage generating unit 250 in section B.

According to an exemplary embodiment, the logic voltage generating unit 250 may generate a logic voltage in an environment in which the analog voltage VCI is applied to the first power generating unit 210 and the logic I/O voltage VDDIO is not applied to the second power generating unit 230, and when the first-inputted analog voltage VCI is used as a main power.

Figure 5A:
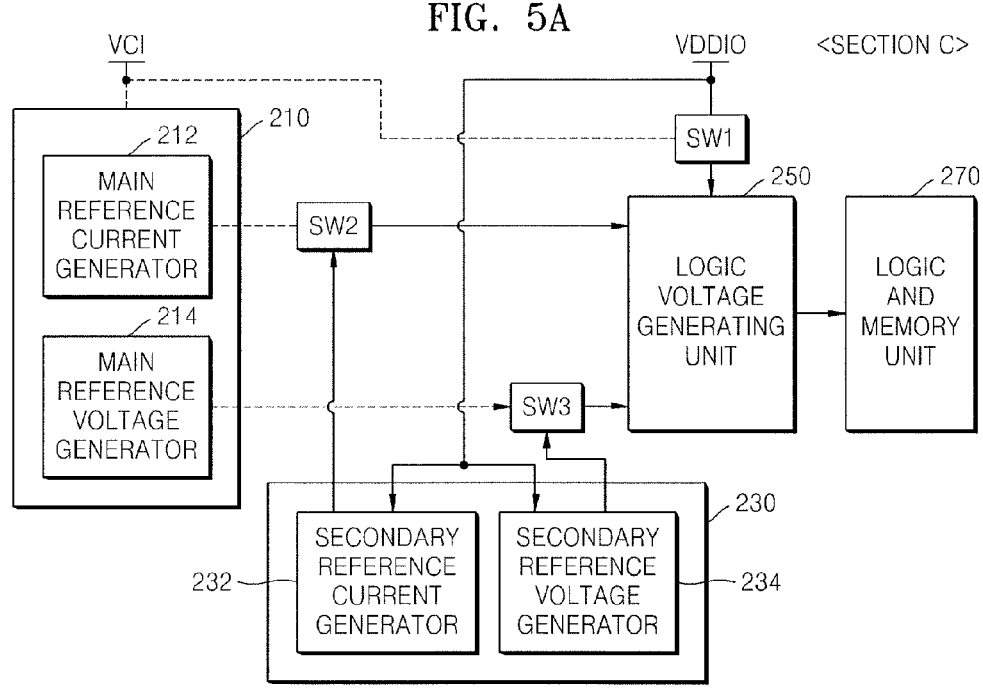
FIGS. 5A and 5B block diagrams illustrating a second logic voltage generating operation performed by the driver IC illustrated in FIG. 2, according to an exemplary embodiment.
Figure 5B:
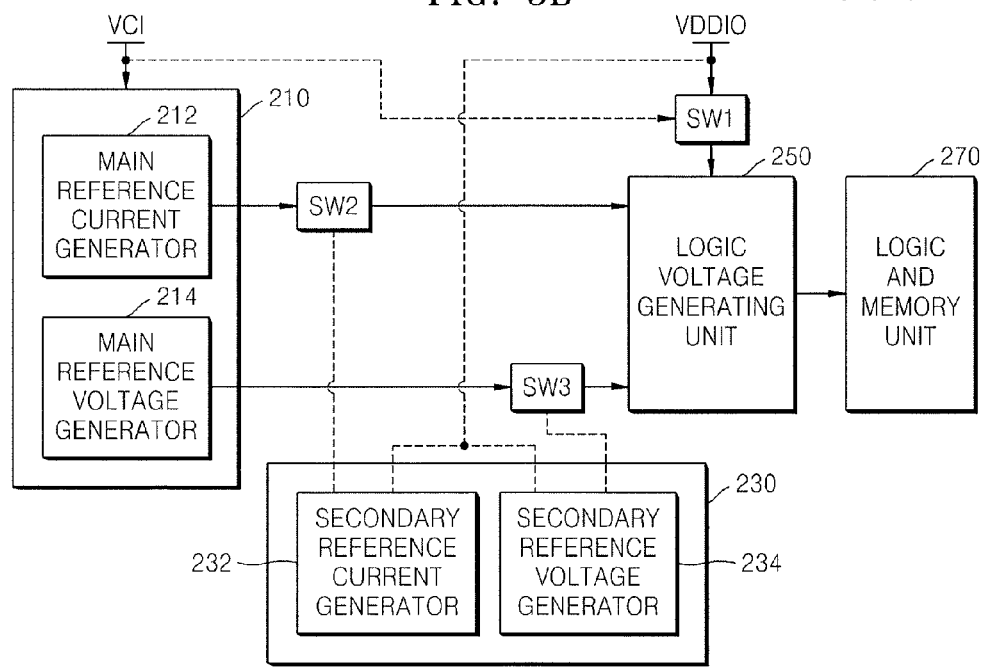
Figure 6:
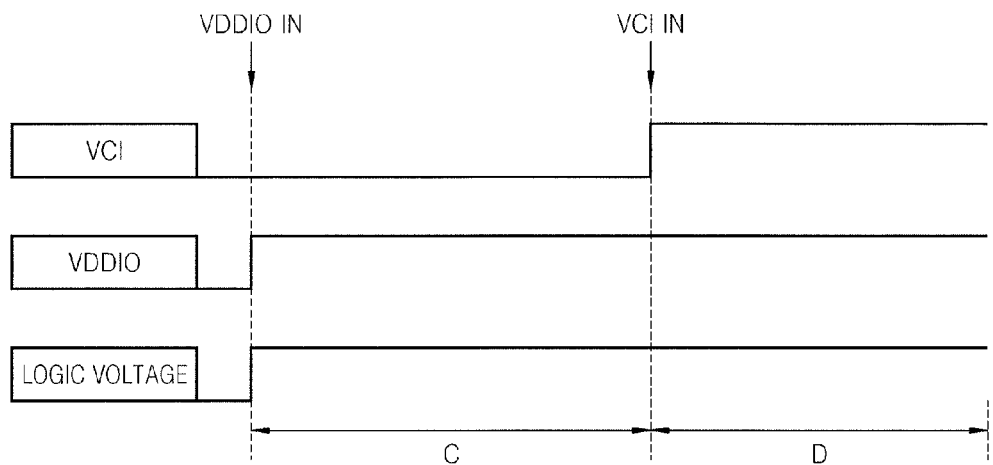
FIG. 6 illustrates a timing diagram for generating a logic voltage when the second logic voltage generating operations illustrated in FIGS. 5A and 5B are performed.

FIGS. 5A and 5B are block diagrams illustrating a second logic voltage generating operation performed by the driver IC 200 illustrated in FIG. 2, according to another exemplary embodiment, and FIG. 6 illustrates a timing diagram of generating a logic voltage when the second logic voltage generating operation illustrated in FIGS. 5A and 5B is performed.

FIGS. 5A and 5B illustrate operations of the driver IC 200 in a power environment in which the logic I/O voltage VDDIO is first applied to the driver IC 200 and then the analog voltage VCI is applied to the driver IC 200.

FIG. 5A illustrates an operation of the driver IC 200 in a power environment (section C) in which the logic I/O voltage VDDIO is first applied to the driver IC 200 and the analog voltage VCI is not applied to the driver IC 200.

The second power generating unit 230 receives the logic I/O voltage VDDIO, and the secondary reference current generator 232 and the secondary reference voltage generator 234 are in an operational state. In this regard, the first power generating unit 210 is in an off state, e.g., a non-operational state.

The secondary reference current generator 232 generates the reference current by converting the logic I/O voltage VDDIO. The secondary reference voltage generator 234 generates the reference voltage by converting the logic I/O voltage VDDIO.

The first switch SW1 connects the power supply unit 100 for supplying the logic I/O voltage VDDIO and the logic voltage generating unit 250. Thus, the driving current generated by the logic I/O voltage VDDIO is applied to the logic voltage generating unit 250.

The second switch SW2 connects the secondary reference current generator 232 and the logic voltage generating unit 250. Thus, the reference current outputted from the secondary reference current generator 232 is applied to the logic voltage generating unit 250.

The third switch SW3 connects the secondary reference voltage generator 234 and the logic voltage generating unit 250. Thus, the reference voltage outputted from the secondary reference voltage generator 234 is applied to the logic voltage generating unit 250.

FIG. 5B illustrates an operation of the driver IC 200 in a power environment (section D) in which the logic I/O voltage VDDIO is first applied to the driver IC 200 and then thereafter the analog voltage VCI is applied to the driver IC 200.

The first power generating unit 210 receives the analog voltage VCI, and the main reference current generator 212 and the main reference voltage generator 214 are in an operational state. In this regard, the second power generating unit 230 is in an off state, e.g., in a non-operational state.

The main reference current generator 212 generates the reference current by converting the analog voltage VCI. The main reference voltage generator 214 generates the reference voltage by converting the analog voltage VCI.

In the section D, e.g., subsequent to the section C, the first switch SW1 connects the power supply unit 100 for supplying the logic I/O voltage VDDIO and the logic voltage generating unit 250. Thus, the driving current generated by the logic I/O voltage VDDIO is applied to the logic voltage generating unit 250.

The second switch SW2 disconnects the secondary reference current generator 232 and the logic voltage generating unit 250 and connects the main reference current generator 212 and the logic voltage generating unit 250. Thus, the reference current outputted from the main reference current generator 212 is applied to the logic voltage generating unit 250.

The third switch SW3 disconnects the secondary reference voltage generator 234 and the logic voltage generating unit 250 and connects the main reference voltage generator 214 and the logic voltage generating unit 250. Thus, the reference voltage outputted from the main reference voltage generator 214 is applied to the logic voltage generating unit 250.

Referring to FIG. 6, in the section C, the logic I/O voltage VDDIO is applied to the second power generating unit 230, and the reference voltage and the reference current generated by the logic I/O voltage VDDIO are applied to the logic voltage generating unit 250 so that a logic voltage is generated by the logic voltage generating unit 250.

Next, in the section D, the analog voltage VCI is applied to the first power generating unit 210, and the reference voltage and the reference current generated by the analog voltage VCI are applied to the logic voltage generating unit 250 so that a logic voltage is generated by the logic voltage generating unit 250. In this regard, generation of the reference voltage and the reference current by the logic I/O voltage VDDIO may be blocked.

The driving current for driving the logic voltage generating unit 250 may be generated by the logic I/O voltage VDDIO in the sections C and D and then may be applied to the logic voltage generating unit 250.

According to an exemplary embodiment, the logic voltage generating unit 250 may generate a logic voltage in an environment in which the logic I/O voltage VDDIO is applied to the second power generating unit 230 and the analog voltage VCI is not applied to the first power generating unit 210, and when the first-inputted logic I/O voltage VDDIO is used as a main power.

Figure 7:
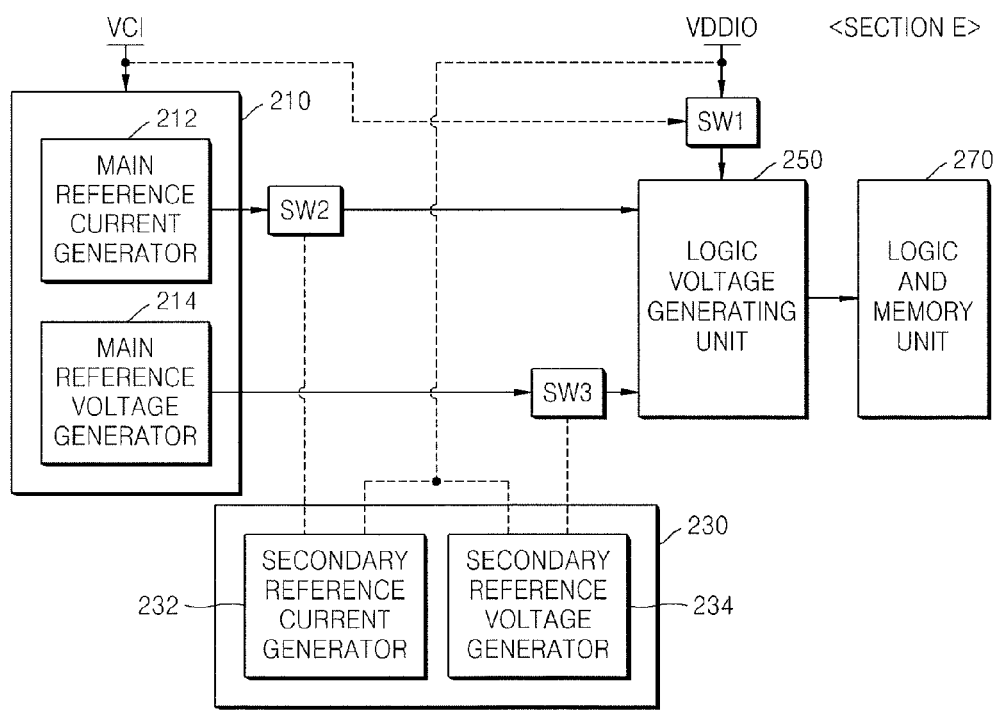
FIG. 7 illustrates a block diagram of a third logic voltage generating operation performed by the driver IC illustrated in FIG. 2, according to another exemplary embodiment.
Figure 8:
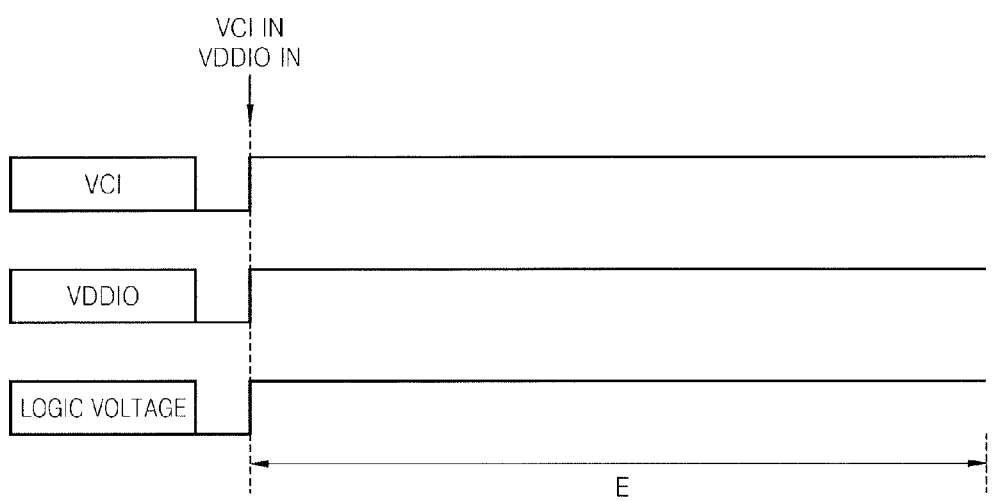
FIG. 8 illustrates a timing diagram of generating a logic voltage when the third logic voltage generating operation illustrated in FIG. 7 is performed.

FIG. 7 is a block diagram illustrating a third logic voltage generating operation performed by the driver IC 200 illustrated in FIG. 2, according to another exemplary embodiment, and FIG. 8 illustrates a timing diagram of generating a logic voltage when the third logic voltage generating operation illustrated in FIG. 7 is performed.

FIG. 7 illustrates an operation of the driver IC 200 in a power environment (section E) in which the analog voltage VCI and the logic I/O voltage VDDIO are simultaneously applied to the driver IC 200. In this regard, the analog voltage VCI is used as a main power, and the logic I/O voltage VDDIO is used for supplying the driving current to the logic voltage generating unit 250.

The first power generating unit 210 receives the analog voltage VCI and operates when the main reference current generator 212 and the main reference voltage generator 214 are turned on, e.g., in an operational state. In this regard, the second main power generating unit 230 is in an off state.

The main reference current generator 212 generates the reference current by converting the analog voltage VCI. The main reference voltage generator 214 generates the reference voltage by converting the analog voltage VCI.

The first switch SW1 connects the power supply unit 100 for supplying the logic I/O voltage VDDIO and the logic voltage generating unit 250. Thus, the driving current generated by the logic I/O voltage VDDIO is applied to the logic voltage generating unit 250.

The second switch SW2 connects the main reference current generator 212 and the logic voltage generating unit 250. Thus, the reference current outputted from the main reference current generator 212 is applied to the logic voltage generating unit 250.

The third switch SW3 connects the main reference voltage generator 214 and the logic voltage generating unit 250. Thus, the reference voltage outputted from the main reference voltage generator 214 is applied to the logic voltage generating unit 250.

Referring to FIG. 8, in the section E, the reference voltage and the reference current generated by the analog voltage VCI are applied to the logic voltage generating unit 250 so that a logic voltage is generated by the logic voltage generating unit 250.

In the section E, the driving current for driving the logic voltage generating unit 250 is generated by the logic I/O voltage VDDIO and is applied to the logic voltage generating unit 250.

According to the present embodiment, the logic voltage generating unit 250 may generate the logic voltage by supplying the driving current generated by the logic I/O voltage VDDIO and by supplying the reference current and the reference voltage generated by the analog voltage VCI.

Figure 9:
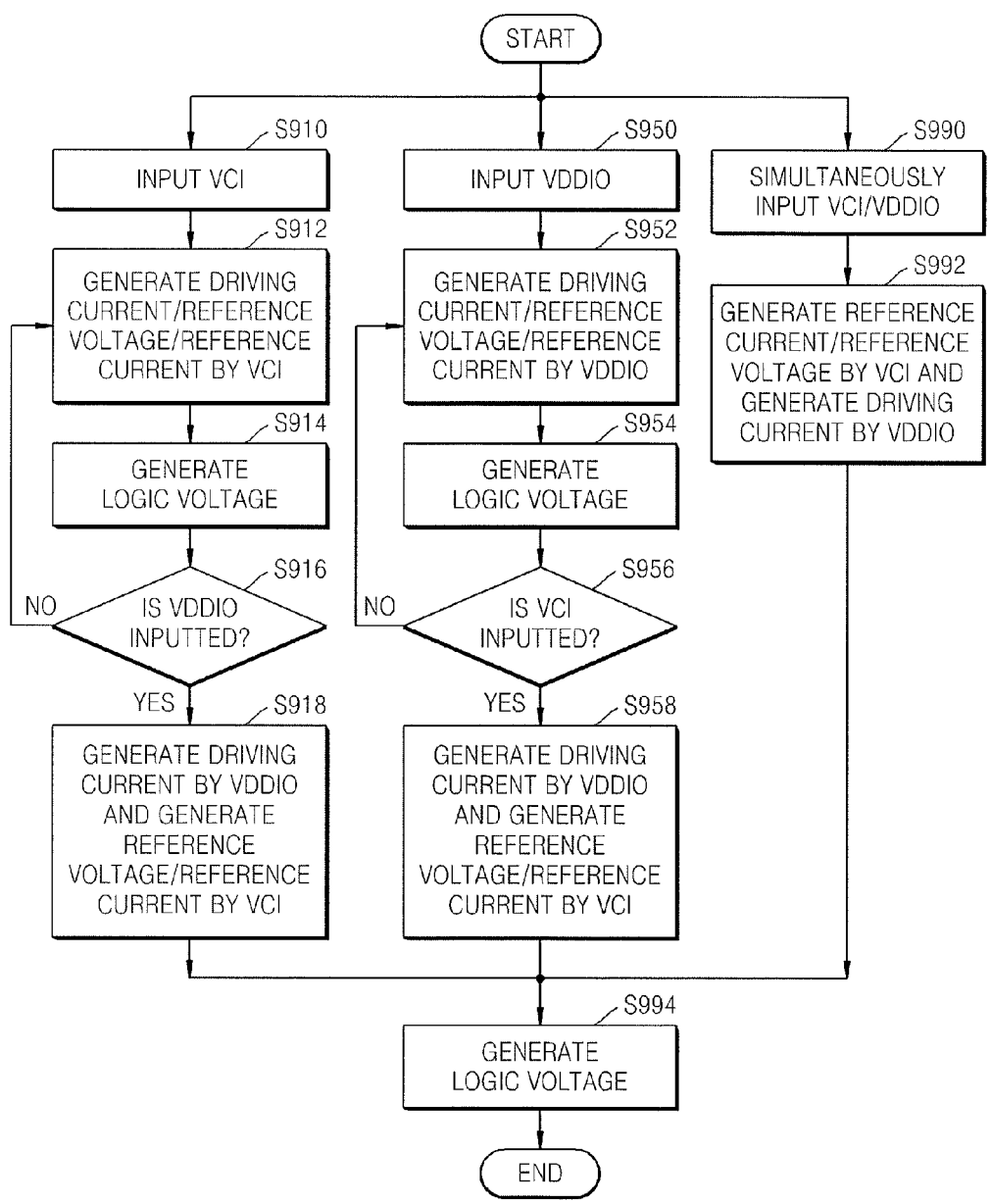
FIG. 9 illustrates a flowchart schematically depicting stages in methods of generating a logic voltage using the driver IC illustrated in FIG. 2, according to exemplary embodiments.

FIG. 9 is a flowchart schematically illustrating stages in a method of generating a logic voltage using the driver IC 200 of FIG. 2, according to various exemplary embodiments.

Referring to FIG. 9, in operation S910, when an analog voltage VCI is first applied to the driver IC 200, in operation S912 the driver IC 200 generates a reference voltage, a reference current, and a driving current based on an analog voltage VCI. In operation S914, the logic voltage generating unit 250 is driven by the driving current and generates a logic voltage based on the reference voltage and the reference current. In operation S916, if a logic I/O voltage VDDIO is applied to the driver IC 200 after a predetermined amount of time elapses, in operation S918, the driver IC 200 generates the driving current based on the logic I/O voltage VDDIO and subsequently generates the reference voltage and the reference current based on the analog voltage VCI. In operation S994, The logic voltage generating unit 250 is driven by the driving current and generates a logic voltage based on the reference voltage and the reference current.

In operation S950, when the logic I/O voltage VDDIO is first applied to the driver IC 200, the driver IC 200 generates a reference voltage, a reference current, and a driving current based on the logic I/O voltage VDDIO in operation S952. In operation S954, the logic voltage generating unit 250 is driven by the driving current and generates a logic voltage based on the reference voltage and the reference current. In operation S956, if the analog voltage VCI is applied to the driver IC 200 after a predetermined amount of time elapses, in operation S958, the driver IC 200 generates the driving current based on the logic I/O voltage VDDIO and generates the reference voltage and the reference current based on the analog voltage VCI. In operation S994, the logic voltage generating unit 250 is driven by the driving current and generates a logic current based on the reference voltage and the reference current.

In operation S990, when the analog voltage VCI and the logic I/O voltage VDDIO are simultaneously applied to the driver IC 200, the analog voltage VCI functions as a main power. Thus, in operation S992, the driver IC 200 generates a reference voltage and a reference current based on the analog voltage VCI and generates a driving current based on the logic I/O voltage VDDIO. In operation S994, the logic voltage generating unit 250 is driven by the driving current and generates a logic voltage based on the reference voltage and the reference current.

According to the present embodiment, a first-inputted voltage may be used as a main power for generating a logic voltage, and when two voltages are simultaneously inputted or one thereof is inputted and then the other one thereof is inputted, one thereof is converted into a main power for generating a logic voltage. Thus, the logic voltage may be stably generated on an irregular power on condition and may be supplied to a logic and memory unit.

As described above, according to exemplary embodiments, a logic voltage of a driver IC may be stably generated and supplied under an irregular voltage input environment, e.g., in an environment of improperly timed voltage input. Thus, a leakage current may be reduced and/or prevented from being generated. Accordingly, the possibility of a logic malfunction may be reduced and/or prevented, and stable logic and memory initialization may be performed.

By way of summation and review, a display apparatus may include a display unit that has a plurality of scan lines S1 to Sn, a plurality of data lines D1 to Dm, and a plurality of pixels P, and a driver unit for applying scan signals via the scan lines S1 to Sn and for applying data signals via the data lines D1 to Dm to the display unit. The driver unit may generate a plurality of signals to be supplied to a display panel from a voltage supplied by an external power source. The driver unit may be mounted in the form of an integrated circuit (IC) chip directly on the display unit or may be integrated with the display unit together with signal lines that are the plurality of scan lines S1 to Sn and the plurality of data lines D1 to Dm for applying scan signals and data signals, respectively.

The driver unit may generate an internal logic voltage in response to two external voltages, such as analog voltage VCI and a logic input/output (I/O) voltage VDDIO, which are supplied by the external power source. In this regard, the timing for applying the analog voltage VCI and the logic I/O voltage VDDIO may be irregular. As a result, a leakage current and/or logic malfunction may occur in the driver unit. Accordingly, exemplary embodiments relate to a driver integrated circuit (IC) of a display apparatus and to a method of generating a logic voltage using the driver IC, which include stably generating a logic voltage from an external voltage that is irregularly applied to a driver integrated circuit (IC) of a display apparatus.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A driver integrated circuit (IC) of a display apparatus that generates a logic voltage in a power environment in which an analog voltage and a logic input/output (JO) voltage are irregularly inputted to the driver IC, the driver IC comprising:
   a first power generating unit that generates a first reference current and a first reference voltage based on the analog voltage;
   a second power generating unit that generates a second reference current and a second reference voltage based on the logic I/O voltage; and
   a logic voltage generating unit that generates a logic voltage in response to the first reference current and voltage or the second reference current and voltage according to an application order of the analog voltage and the logic I/O voltage in the power environment in which the analog voltage and the logic I/O voltage are irregularly inputted to the driver IC.

2. The driver IC of claim 1, further comprising:
   a second switch that outputs the first reference current generated by the analog voltage or the second reference current generated by the logic I/O voltage to the logic voltage generating unit; and
   a third switch that outputs the first reference voltage generated by the analog voltage or the second reference voltage generated by the logic I/O voltage to the logic voltage generating unit.

3. The driver IC of claim 2, wherein a driving current generated by one of the analog voltage and the logic I/O voltage is applied to the logic voltage generating unit according to the application order of the analog voltage and the logic I/O voltage.

4. The driver IC of claim 3, further comprising a first switch that outputs the driving current to the logic voltage generating unit.

5. The driver IC of claim 4, wherein, when the application order includes the analog voltage being first applied to the driver IC, the first switch outputs the driving current generated by the analog voltage to the logic voltage generating unit, and the second switch outputs the first reference current generated by the analog voltage to the logic voltage generating unit, and the third switch outputs the first reference voltage generated by the analog voltage to the logic voltage generating unit.

6. The driver IC of claim 5, wherein, when the application order includes the logic I/O voltage being subsequently applied to the driver IC, the first switch outputs the driving current generated by the logic I/O voltage to the logic voltage generating unit.

7. The driver IC of claim 4, wherein, when the application order includes the logic I/O voltage being first applied to the driver IC, the first switch outputs the driving current generated by the logic I/O voltage to the logic voltage generating unit, and the second switch outputs the second reference current generated by the logic I/O voltage to the logic voltage generating unit, and the third switch outputs the second reference voltage generated by the logic I/O voltage to the logic voltage generating unit.

8. The driver IC of claim 7, wherein, when the application order includes the analog voltage being subsequently applied to the driver IC, the second switch outputs the first reference current generated by the analog voltage to the logic voltage generating unit, and the third switch outputs the first reference voltage generated by the analog voltage to the logic voltage generating unit.

9. A method of generating a logic voltage in a power environment in which an analog voltage and a logic input/output (IO) voltage are irregularly inputted to a driver integrated circuit (IC), the method comprising:
   generating a reference current and a reference voltage based on one of the analog voltage and the logic I/O voltage according to an application order of the analog voltage and the logic I/O voltage; and
   generating a logic voltage based on the reference current and the reference voltage generated by the one of the analog voltage and the logic I/O voltage in the power environment in which the analog voltage and the logic I/O voltage are irregularly inputted to the driver IC.

10. The method of claim 9, wherein the generating of the logic voltage includes applying a driving current generated by the one of the analog voltage and the logic I/O voltage or another of the analog voltage and the logic I/O voltage according to the application order.

11. The method of claim 10, wherein, when the application order includes the analog voltage being first applied to the driver IC, the generating of the logic voltage includes generating the logic voltage based on the driving current, the reference current, and the reference voltage generated by the analog voltage.

12. The method of claim 11, wherein, when the application order includes the logic I/O voltage being subsequently applied to the driver IC, the generating of the logic voltage includes generating the logic voltage based on the driving current generated by the logic I/O voltage and the reference current and the reference voltage generated by the analog voltage.

13. The method of claim 10, wherein, when the application order includes the logic I/O voltage being first applied to the driver IC, the generating of the logic voltage includes generating the logic voltage based on the driving current, the reference current, and the reference voltage generated by the logic I/O voltage.

14. The method of claim 13, wherein, when the application order includes the analog voltage being subsequently applied to the driver IC, the generating of the logic voltage includes generating the logic voltage based on the driving current generated by the logic I/O voltage and the reference current and the reference voltage generated by the analog voltage.

* * * * *